Figure 1:
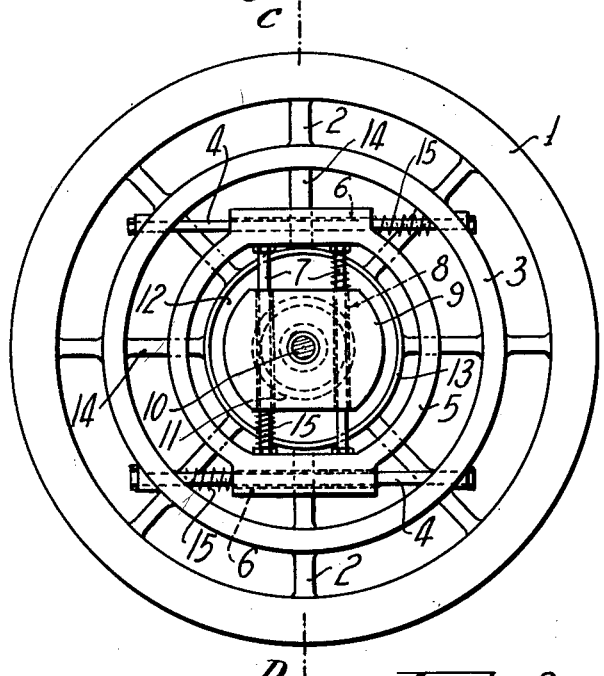

May 15, 1951  C. O. MARTINTO  2,553,419
ELASTIC WHEEL FOR VEHICLES
Filed Jan. 4, 1946  2 Sheets-Sheet 1

INVENTOR:
Cesar Oscar Martinto
BY
Richards Geier
ATTORNEYS

May 15, 1951  C. O. MARTINTO  2,553,419
ELASTIC WHEEL FOR VEHICLES
Filed Jan. 4, 1946  2 Sheets-Sheet 2
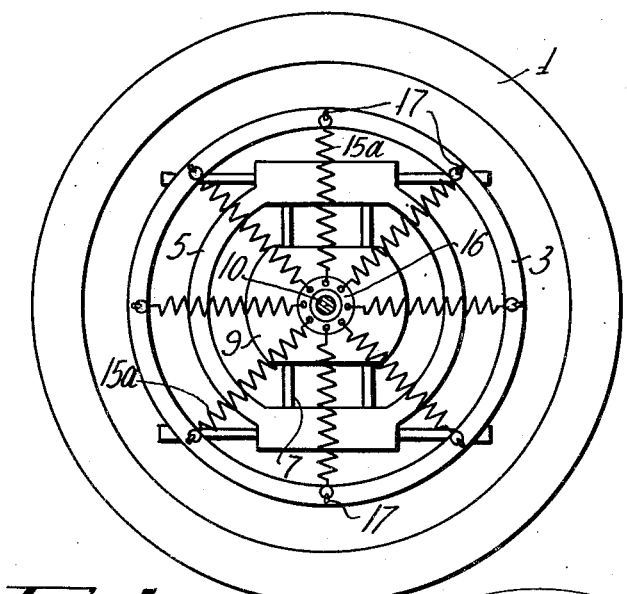
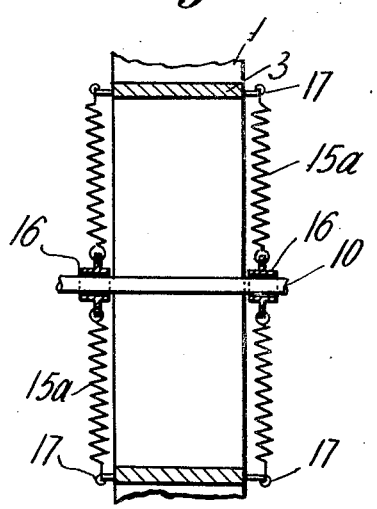
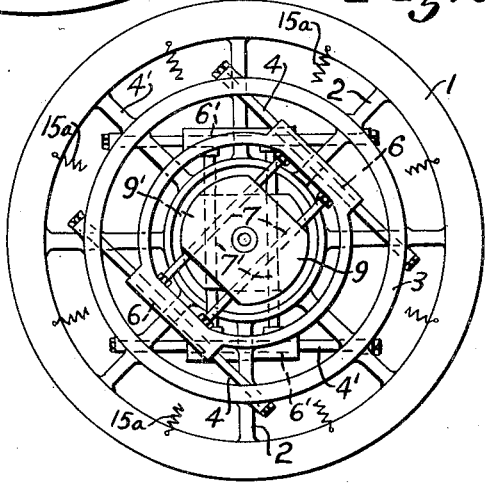
INVENTOR:
Cesar Oscar Martinto
BY
ATTORNEYS Patented May 15, 1951

2,553,419

UNITED STATES PATENT OFFICE 2,553,419

ELASTIC WHEEL FOR VEHICLES

Cesar O. Martinto, Buenos Aires, Argentina, assignor of one-half to Raul Cogan, Buenos Aires, Argentina Application January 4, 1946, Serial No. 638,962
In Argentina January 4, 1945

5 Claims. (Cl. 152—103)

This invention is related with an elastic wheel for vehicles in general and more particularly for automotive ones, having been created with the object in mind of replacing the known tires (cover and inner tube) by reason of their present expensiveness.

Another object of this invention is to provide an elastic wheel offering greater safety to the occupants of a vehicle, inasmuch as such risks as punctures, explosions and other dangers menacing from the present pneumatic tires are eliminated from this new wheel.

Notwithstanding this, the wheel according to this invention permits the application of a pneumatic merely as an elastic means and thus not applied to the tread of the wheel.

Another advantage afforded by the wheel according to this invention consists in the possibility of controlling the elastic tension or the power of absorption of the movements of the vehicle as produced by the unevenness of the ground, in accordance with the ponderal measure of the vehicle proper and its overload, this control being made in advance on knowing both the conditions under which the vehicle will have to work regarding its load and tare, and the nature of the ground on which it is to ride.

The principal features characterizing the wheel reside in a ring or frame normally concentric with the axle and rim of the wheel and provided with two guide-bars parallel with one another and on which another frame or support slides which is also equipped with two guide-bars, in perpendicular relationship with the two first ones and wherein plays a piece which we might call the core or hub of the wheel as it is secured to the axle of the same and located, therefore, in the center of the whole unit.

This arrangement allows of giving the wheel liberty of oscillatory movement in any radial sense but not in the lateral sense for evident reasons of safety and rigidity. To still more contribute to this end the wheel is equipped with another set of guides and frames like those described and which both act approximately in juxtaposition, the only difference being that one of the sets is displaced by 45° of angular rotation from the other one.

Now then, having this structure, the wheel receives elastic elements for imparting it elasticity and which are made up particularly by a small rubber or the like air-chamber mounted around the axle on an appropriate rim and having its circumference resting on a ring linked to the principal rim or tread band of the wheel.

All or certain wheels of this type are fitted with compensatory springs radially arranged from a bushing mounted on the axle to the rim.

Figure 3:
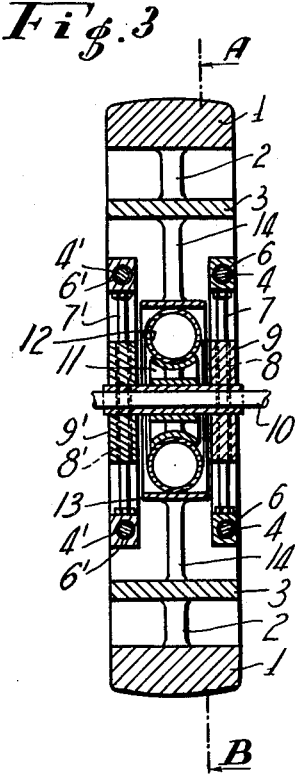
Figure 2:
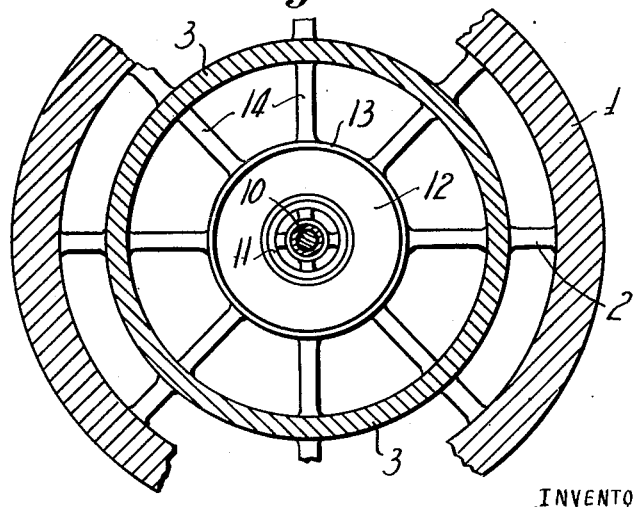

In order that the invention may be fully understood and readily put into practice, the same is illustrated by way of example on the attached drawings wherein:

Figure 1 is a general side view of the wheel according to this invention,

Figure 2 is a partial illustration, according to the section as indicated by line A—B of Figure 3, of the air-chamber lodged in the center of the wheel, Figure 3 is illustrative of the central section as indicated by line C—D of Figure 1, showing the elements constituting the wheel, Figure 4 is a side view of the same wheel having applied to it the radial compensatory springs that afford the corresponding elasticity, and Figure 5 is a central section of this same wheel showing the springs and the elements directly associated therewith only.

Figure 6 is also a general side view of the wheel according to this invention but with the guides and frames displaced by 45° of angular rotation from those shown in Figure 1.

In the various figures of the drawings equal visible parts are indicated by the same reference numerals.

The construction in accordance with the invention shown consists of the principal rim 1 made of any material or combination of materials capable of acting as the tread band of the wheel.

By means of several spokes 2 main rim 1 is connected to the ring 3 forming an integral part thereof, both elements thus being concentric and forming a rigid unit.

On the other hand, it will be noted from Figs. 1 and 3 that the said ring 3 possesses at each side two bars which we shall call guides 4 and 4', in parallel relationship with one another and secured in any suitable way to the said ring 3.

On the said guides 4—4' are mounted slidably the rims 5—5', such guides passing through holes 6—6' bored in the rims, allowance being made for a certain play so as not to jam the free movement of the system.

The said rims 5—5', in turn, are equipped each with a pair of guide-bars 7—7', in parallel relationship with one another and rigidly secured in perpendicular direction with respect to those first mentioned. The said guide-bars 7—7' freely pass through just as many orifices 8—8' bored in two pieces which we shall call cores or hubs 9—9' by reason of their occupying the center of the wheel, and on these the axle 10 rests, supposed to be keyed or not, depending on whether the axle of the driving wheel or that of the trailing wheel of the vehicle is concerned.

While the drawings illustrate the two guiding systems as being arranged in one and the same rotation position with regard to ring 3 and rim 1, in practice they may be at 45° rotation, i. e., one of these lateral devices of the wheel more advanced or more retroceded than the other, in order that their functions may be better distributed all around the axle 10, as will be seen later on.

Within the space between the just described guiding devices there is housed the element imparting elasticity to the wheel. It comprises a small wheel 11 mounted on axle 10 and carrying the annular air-chamber 12 placed around it. This chamber 12 while resembling the usual ones is of smaller diameter and may be reinforced by a suitable fabric or the like protecting cover.

Coinciding with the periphery of this chamber 12 is a wide check-ring 13 forming by means of the spokes 14 an integral part of the aforementioned main ring 3, both elements being concentric, as will be gathered from Fig. 2.

It is pointed out that the elastic resistance of the wheel may be re-inforced or controlled by the aid of springs (such as indicated at 15, Fig. 1) which, if expedient, will be placed in the free portions around the guides 4—4' and 7—7'. As these springs may be dispensed with no further illustration is made of them on the drawings.

The construction shown in Figures 4 and 5 serves the same purpose and also permits the maximum elastic displacement of the rims 5a and core or hub 9a, if need be; in this construction the radial springs 15a are substituted for springs 15. One end of each of them is hooked up to the bushing 16 on axle 10 and the other one hooked up to its respective hook 17 secured to this effect to main ring 3. Thus arranged, the springs 15a occupy equal central angles extending from axle 10a, as will be seen from Fig. 4, when the other side of the wheel may be equipped with a like set of springs 15a.

The operation is as follows:

It has been shown that an elastic means, viz. the chamber 12, acts between the axle 10 receiving its load from the vehicle and the whole formed by the wheel. Indeed, the axle 10 rests on the small wheel 11 carrying the chamber 12 and this, in turn, rests externally on the ring 13 forming one piece with the main ring 3 and rim 1 that brushes the ground.

On the other hand, the oscillations produced by the unevenness of the road on which the vehicle rides are consequently taken up by the air chamber 12, as will be readily appreciated.

This, however, is not sufficient, it being necessary to provide the wheel with enough rigidity to resist the lateral stresses without thereby preventing the wheel from its elastic play. To this effect, the guide devices as explained hereinbefore are provided. Whatever the vertical movement of the wheel may be, it can take place by the aid of the said guides.

Let us suppose that the position of the wheel be that of Fig. 1 and that the wheel receive an oscillatory movement brought about by an obstacle on the ground. The blow received by the rim 1 causes this oscillatory effect to be produced, and the same will be transmitted, as has been seen, to the chamber 12; the movement of the rim 1 will not be hindered owing to the bars 7 sliding with the former under the guidance of the core or hub 9; if the wheel were at 90° with respect to the position dwelt on in the foregoing, the bars 4 would slide being guided through the holes 6 of rim 5, and if the wheel were to take another position between those considered in the foregoing, sliding would take place of the two pairs of bars 4 and 7 in a distributed and mixed manner, in accordance with a simple physical law of resolving a force along two directions.

For reasons of clearness, reference has been made to the guide device that is visible in Fig. 1, but it goes without saying that the one existing on the opposite side will act in just the same manner. It has been said also that one of these devices may be turned at 45° with respect to the other one in order to bring about some sort of compensation or equilibrium in the distribution of the stresses. It will be expedient, to wind up, that a space wide enough to permit the free play of expansion of the chamber 12 should exist between the two devices.

In case these wheels were intended for very heavy vehicles, or for any other eventual reason, springs may be adapted to the free portions of the bars 4 and 7, as is shown at 15 in Fig. 1, without laying claim on novelty therefor, the said springs acting as elements co-operating in the elasticity of the wheel.

This is true also for the springs 15a (Figs. 4 and 5) yielding the necessary elasticity to make up for any unevenness of the road on which the wheel according to this invention is riding.

The springs 15a may be either compression or tension springs.

Last but not least lateral covers or discs may be used to protect the wheel against dust and other particles it may meet with during its performance.

Some of the constituents of the wheel may be mounted by means of nuts, screws, pins, etc., so as to permit ready removal for repairing or replacing parts worn by use or damaged in any way whatever.

It is obvious that certain detail constructional modifications may be introduced without thereby departing from the scope of this invention the nature of which is clearly ascertained in the appended claiming clauses.

What I claim is:

1. An elastic wheel for vehicles, characterized in that it is constituted by at least one pair of parallel guides arranged in one direction, and by at least another pair of guides arranged in the other direction, the said guides being formed by two pairs of bars one of which pairs is mounted within a ring concentric with and secured to the main rim of the wheel and the other one secured within a rim through which the first named pair of bars passes freely while the second pair passes in the same manner through a hub mounted on the main axle of the wheel, with the elastic means of the latter comprising: a pneumatic chamber mounted around the said axle on the rim of a little wheel mounted on the same axle, which chamber is near the aforementioned guide device and has its periphery encircled by a wide ring rigidly connected to the rim or tread band of the wheel, and springs located radially between the axle of the wheel and the main ring of the latter, upon at least one side.

2. An elastic wheel for vehicles, comprising two pairs of parallel guides extending in different directions and consisting of bars, a main rim, a ring concentric with said rim and secured thereto, one of said pairs being mounted within said ring and passing freely through said rim, a hub, the other one of said pairs being secured within said rim and passing freely through said hub, means forming a pneumatic chamber extending around the wheel axis, and means connecting said chamber with said ring.

3. An elastic wheel for vehicles according to claim 2 characterized in that a set of guides is disposed on each side of the wheel, one of the sets being arranged at 45° of rotation of the other, the space between the guides housing the elastic means formed by the pneumatic chamber.

4. An elastic wheel for vehicles, comprising two pairs of parallel guides extending in different directions and consisting of bars, a main rim, a ring concentric with said rim and secured thereto, one of said pairs being mounted within said ring and passing freely through said rim, a hub, the other one of said pairs being secured within said rim and passing freely through said hub, means forming a pneumatic chamber extending around the wheel axis, means connecting said chamber with said ring, and springs engaging said ring.

5. An elastic wheel for vehicles, comprising two pairs of parallel guides extending in different directions and consisting of bars, a main rim, a ring concentric with said rim and secured thereto, one of said pairs being mounted within said ring and passing freely through said rim, a hub, the other one of said pairs being secured within said rim and passing freely through said hub, means forming a pneumatic chamber extending around the wheel axis, means connecting said chamber with said ring, and springs between said ring and said guides.

CESAR O. MARTINTO.

REFERENCES CITED

The following references are of record in the file of this patent:

UNITED STATES PATENTS

| Number | Name | Date |
|---|---|---|
| 510,882 | Bourke | Dec. 19, 1893 |
| 645,701 | Ancelle | Mar. 20, 1900 |
| 1,064,189 | Berardini | June 10, 1913 |